(No Model.) 2 Sheets—Sheet 2.

J. F. STEWARD.
HARVESTER.

No. 446,541. Patented Feb. 17, 1891.

Witnesses
Arthur Johnson
Theron Bradford

Inventor.
John F. Steward

UNITED STATES PATENT OFFICE.

JOHN F. STEWARD, OF CHICAGO, ILLINOIS.

HARVESTER.

SPECIFICATION forming part of Letters Patent No. 446,541, dated February 17, 1891.

Application filed September 20, 1890. Serial No. 365,684. (No model.)

*To all whom it may concern:*

Be it known that I, JOHN F. STEWARD, of the city of Chicago, in the county of Cook and State of Illinois, have invented certain new and useful Improvements in Harvesters, of which the following is a full description, reference being had to the accompanying drawings.

My object is to so provide that a harvester-platform may be shortened to enable the machine to pass along a common road, over narrow bridges, through gates and bars, and through doors of storage-sheds or barns, &c.

The invention consists in making the platform in two parts, so that the grain-end portion may be separated from the stubble end and placed preferably thereunder and secured, and the machine thus shortened to an extent sufficient to permit its passage through narrow places, as required, and yet be so rigid as to stand the shocks incident to rough roads.

Figure 1:
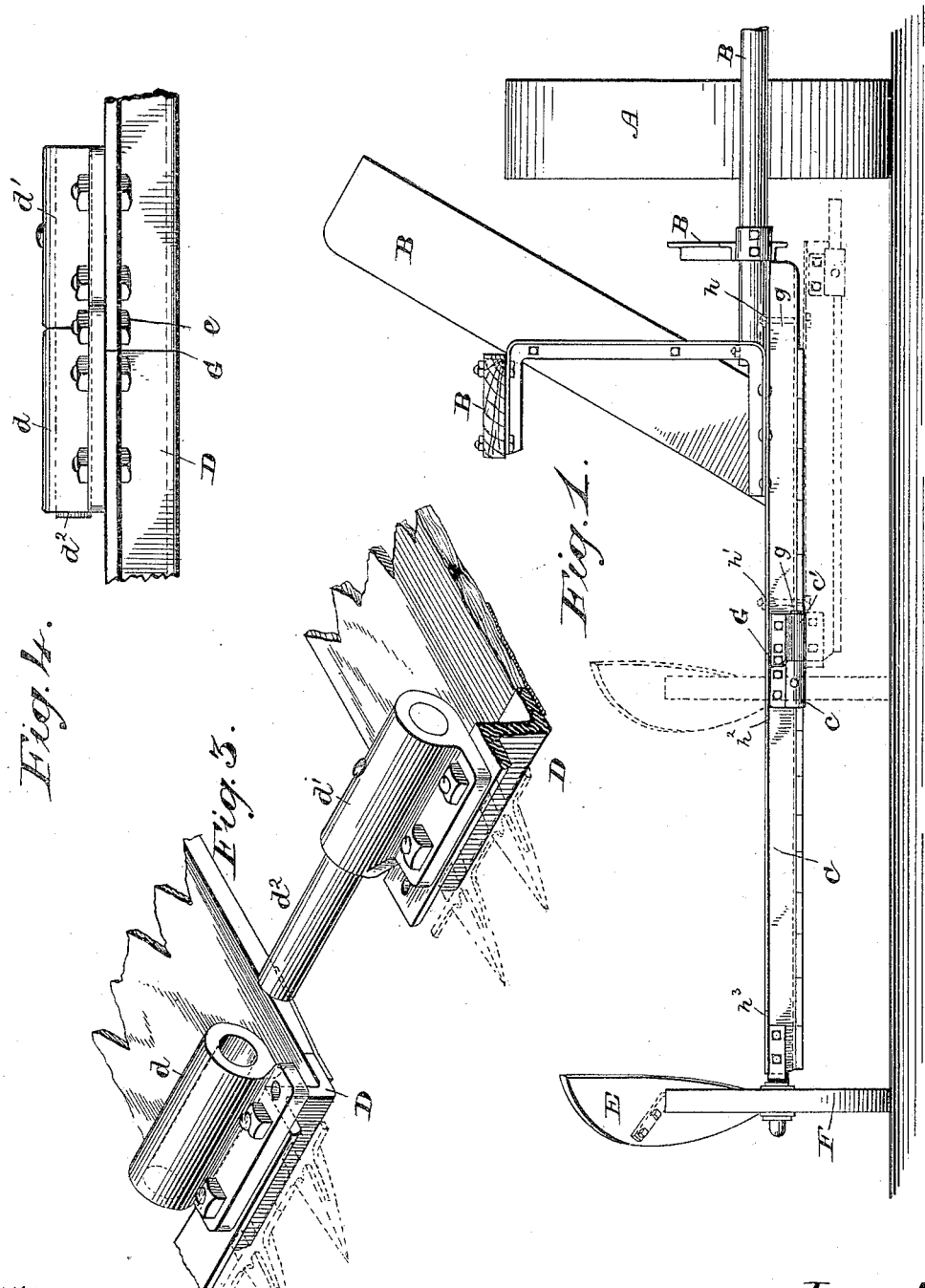
Figure 2:
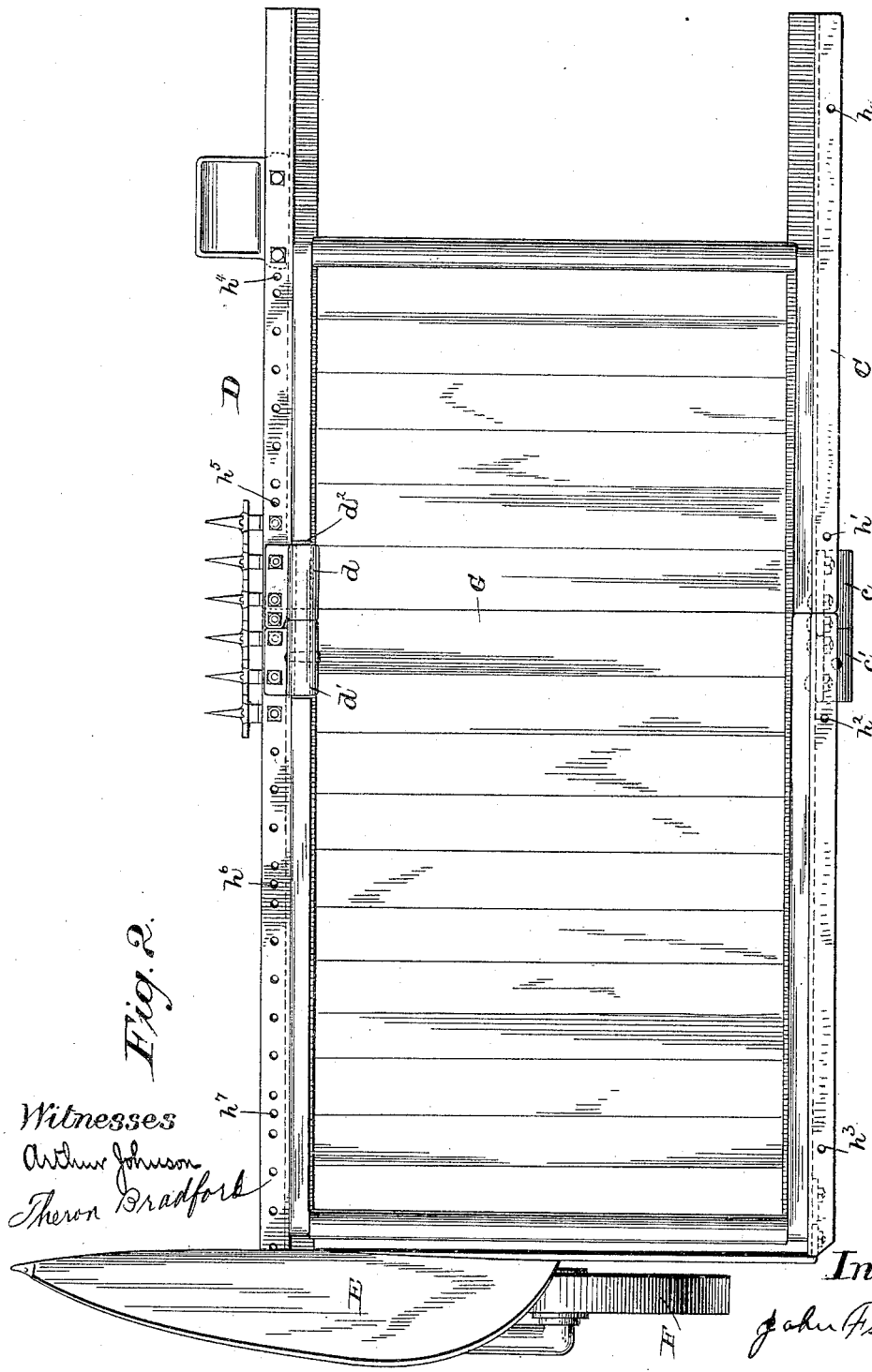

In the drawings, Figure 1 is a rear view of so much of a harvesting-machine as is necessary to show my invention; Fig. 2, a plan view of the main platform; Fig. 3, a perspective view of the means provided for forming the "splice" for the finger-bar, and Fig. 4 is a front view of the same.

A is the master-wheel, and B B B B are parts of the main gearing and elevator-frame.

C is the rear-platform sill, and D the front-platform sill or finger-bar.

E is the divider, and F the divider-wheel, the latter secured to the platform in any of the usual manners.

I cut the platform on the line G and the finger-bar and rear sill upon the same line.

$d$ and $d'$ are sleeve-like castings, each bolted to the finger-bar, one upon each side of the joint, forming what may be considered simply a dowel-pin and socket. $c$ and $c'$ are similar parts upon the rear sill. By the use of these dowels and sockets the splice in the platform may be quickly made. For convenience in manufacture, I secure the dowel $d^2$ in the socket $d$ by means of a pin. The dowel may be secured in $c'$ in a similar manner, or they may be cast as one piece. The dowel must be of sufficient strength to prevent the platform from sagging.

In order to prevent the dowels from pulling out, (hence the parts of the platform from moving asunder,) special pins may be provided, or a set-screw or any well-known equivalent; but I prefer to extend the flange of the socket $d$ to a point beyond the splice in the platform, and pass a special bolt $e$ through the hole therein and through the finger-bar, as shown in Figs. 2, 3, and 4. The construction of the splicing parts at the rear of the platform may be precisely the same as those at the front—in fact can be cast from the same patterns, and hence I have shown them alike.

In order to reduce the width of the machine for traveling, it is but necessary to remove the bolt $e$ in front and the bolt $f$ at the rear, when, taking hold of the divider-wheel, the outermost portion of the platform may be pulled away from the inner part and the latter be permitted to fall to the ground. The inner portion of the platform may be blocked up, if desired. As the majority of harvesting-machines with self-binders attached are sufficiently heavy at the stubble side of the wheel that when tilted over some portion of the self-binder will rest upon the ground, the main part of the platform will remain in a high position. The grain-end portion of the platform may then be moved under the main platform and the bolts $g$ passed through the holes in the flanges $h$ $h'$ $h^2$ $h^3$ $h^4$ $h^5$ $h^6$ $h^7$ and drawn up, the parts then being in the position shown in Fig. 1, where the dotted lines show the grain-end portion of the platform under the stubble-end portion of the same. This enables me to move the divider-wheel inward to the extent of about four feet, and permits the machine to be drawn on its supporting-wheels as in the usual manner, but have narrower tread. I have shown the bolts $g$ as the simplest means known to me for securing the two parts of the platform together. I have found other suitable means of securement, but prefer the bolts because cheapest, and on the whole best. I have shown the dowel arrangement of parts for coupling the two pieces of the platform, but do not limit myself to their use, as it is evident that any well-known splicing means may be resorted to.

What I claim as my invention, and desire to secure by Letters Patent, is—

1. In a harvester, the main-frame platform supported upon the main supporting-wheel and upon the grain-wheel, the platform made in two parts, one portion permanently secured to the grain-wheel and the other supported upon the main wheel, the said parts of the platform so spliced together as to form in effect a rigid platform, yet adapted to be separated and the grain-end portion of the platform moved toward the stubble-end portion of the machine, and the width of the latter thus reduced and the said platforms resecured, the one lapping over, substantially as described.

2. In a harvester, the main supporting-wheel and main frame mounted thereon, a short platform secured thereto, the grain-wheel having the outer portion of the grain-receiving platform bolted thereto, splicing couplings, as dowel-pins and sockets, securing the said two parts of the platform, and the said outer portion of the platform adapted to be received beneath the stubble portion of the said platform and there secured, substantially as described.

JOHN F. STEWARD.

Witnesses:
WM. F. RAPELJE,
THERON BRADFORD.